United States Patent [19]

Kapich

[11] Patent Number: 5,236,305

[45] Date of Patent: * Aug. 17, 1993

[54] HIGH SPEED HYDRAULIC TURBINE DRIVE

[76] Inventor: Davorin Kapich, 3111 Serrano Dr., Carlsbad, Calif. 92009

[*] Notice: The portion of the term of this patent subsequent to May 7, 2008 has been disclaimed.

[21] Appl. No.: 890,370

[22] Filed: May 26, 1992

Related U.S. Application Data

[63] Continuation of Ser. No. 655,575, Dec. 24, 1990, abandoned, which is a continuation-in-part of Ser. No. 306,699, Feb. 6, 1989, Pat. No. 5,013,214.

[51] Int. Cl.$^5$ .............................. F01D 9/02
[52] U.S. Cl. .................... 415/202; 417/408
[58] Field of Search ............ 415/202, 110, 111; 417/406–409

[56] References Cited

U.S. PATENT DOCUMENTS

| | | | |
|---|---|---|---|
| 1,172,436 | 2/1916 | Coppus | 417/408 |
| 3,396,941 | 8/1968 | Crawford | 415/904 |
| 3,607,779 | 9/1971 | King | 261/24 |
| 4,097,188 | 6/1978 | Forster | 415/202 |
| 4,786,251 | 11/1988 | Ruegsegger | 415/904 |
| 5,013,214 | 5/1991 | Kapich | 415/202 |

Primary Examiner—John T. Kwon
Attorney, Agent, or Firm—John R. Ross

[57] ABSTRACT

A high speed hydraulic turbine drive. A nozzle body contains a number of nozzles through which hydraulic fluid is discharged to impinge on the blades of a turbine wheel which is fully submerged in the hydraulic fluid. The nozzles are cylindrical or part conical and part cylindrical and the center line of the nozzles for an angle of about 10 to 30 degrees with the outlet surface of the nozzle body. A manufacturing method is provided which permits the manufacture of drives of various power using the same standard machined parts. In preferred embodiments the turbine drive drives high speed and low speed electric generators, a grinder and a garbage disposal unit.

11 Claims, 5 Drawing Sheets

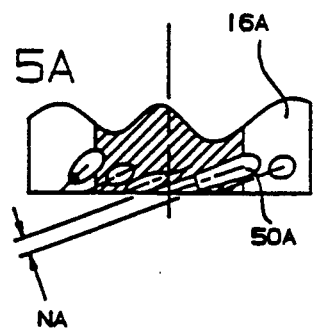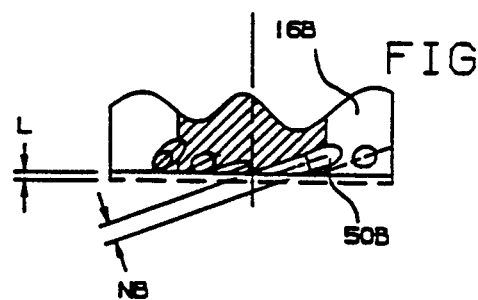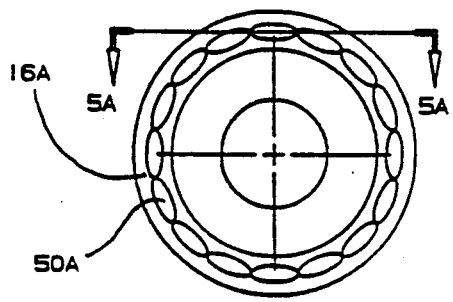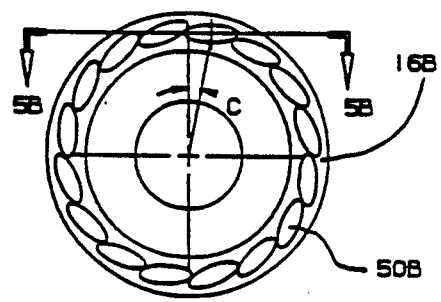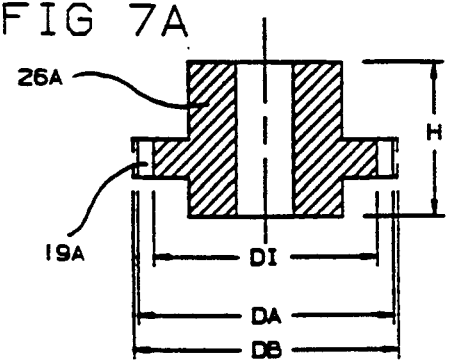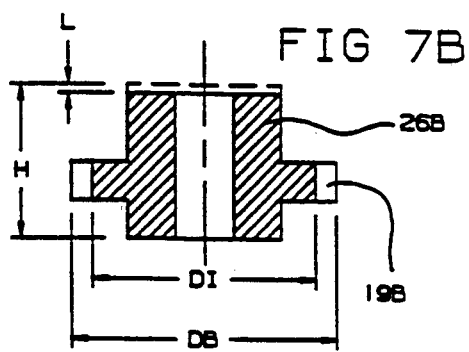

HIGH SPEED HYDRAULIC TURBINE DRIVE

This is a continuation of application Ser. No. 07/655,575, Dec. 24, 1990, abandoned, which is a continuation-in-part application of patent application Ser. No. 07/306,699, filed Dec. 24, 1990, now U.S. Pat. No. 5,013,214 issued May 7, 1991. This invention relates to hydraulic turbine drives and especially to high velocity hydraulic turbine drives.

BACKGROUND OF THE INVENTION

High speed rotating apparatuses, such as high frequency electric generators are often driven by low frequency electric motors or internal combustion engines. In such cases a speed increasing gear box is needed. When the apparatus is driven by a high speed gas turbine, often a speed reducing gear box is needed. Portable grinding and cutting rotating tools are usually driven by high speed pneumatic or electric motors. Sometimes, such tools require a flow of liquid coolant to prevent overheating and also to prevent metal sparks form igniting adjacent materials. Consideration of weight and power output of such tools is very important to its portability.

SUMMARY OF THE INVENTION

The present invention provides a high speed hydraulic turbine drive. A nozzle body contains a number of nozzles through which hydraulic fluid is discharged to impinge on the blades of a turbine wheel which is fully submerged in the hydraulic fluid. The nozzles are cylindrical or part conical and part cylindrical and the center line of the nozzles for an angle of about 10 to 30 degrees with the outlet surface of the nozzle body. A manufacturing method is provided which permits the manufacture of drives of various power using the same standard machined parts.

BRIEF DESCRIPTION OF THE DRAWINGS

FIG. 5A is a sectional view along the line 5A—5A of FIG. 6A of nozzle passage for a relatively lower horsepower turbine.

FIG. 6A is a view of the nozle body for a relatively lower horsepower turbine.

FIG. 7A is a sectional view of the turbine wheel for a relatively lower horsepower turbine.

FIG. 5B is a sectional view along the line 5A—5A of FIG. 6A of nozzle passage for a relatively higher horsepower turbine.

FIG. 6B is a view of the nozle body for a relatively higher horsepower turbine.

FIG. 7B is a sectional view of the turbine wheel for a relatively higher horsepower turbine.

DETAILED DESCRIPTION OF PREFERRED EMBODIMENTS

Figure 1:
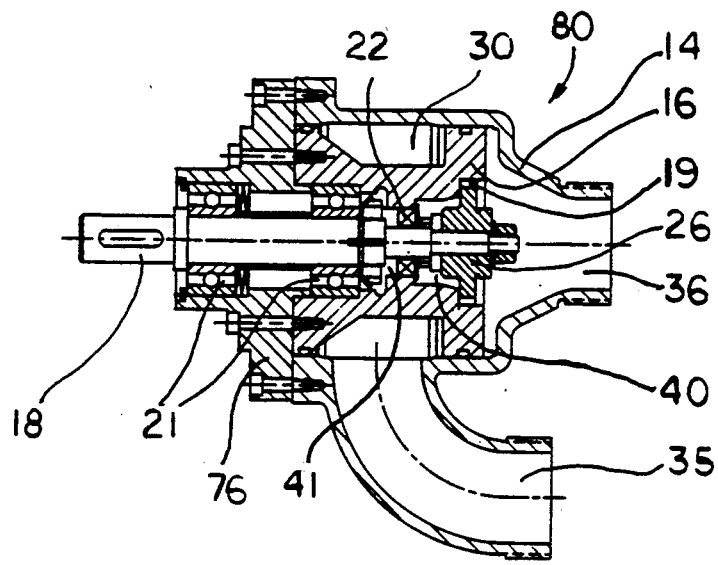
FIG. 1 is a sectional elevation in an axial plane of a turbine drive showing some of the features of the present invention.
Figure 4:
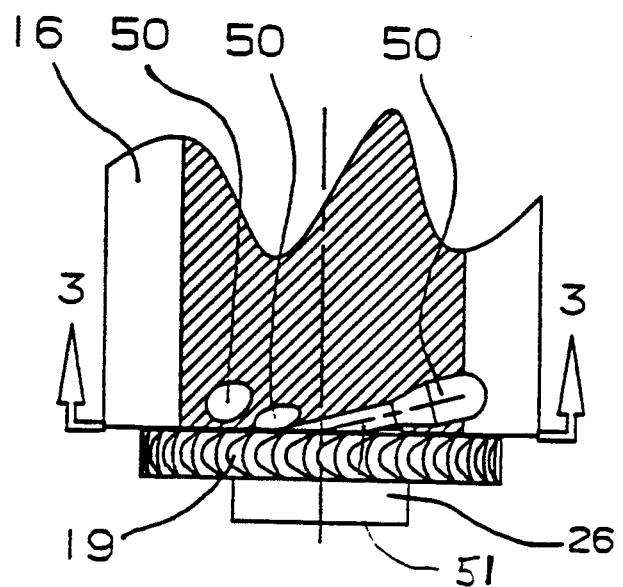
FIG. 4 is a view showing the position of turbine blades relative to nozzle passages.
Figure 3:
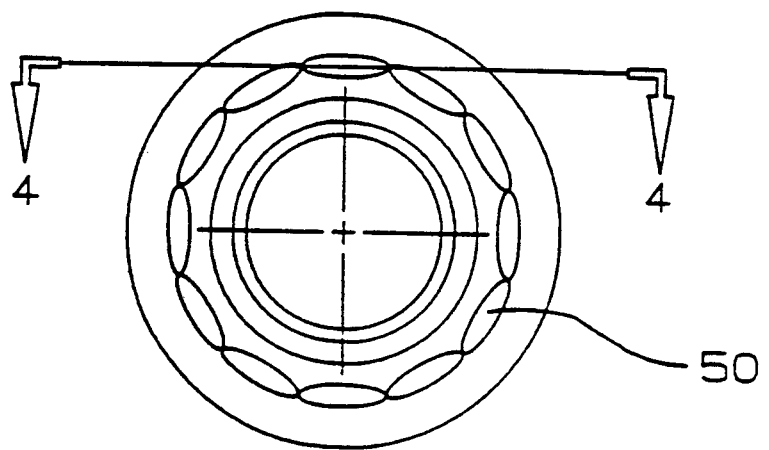
FIG. 3 is a view of the nozzle body of the present invention.

The present invention can be described by reference to the drawings. A preferred embodiment of a light weight water turbine drive is shown in FIG. 1. This turbine is extremely efficient at speeds in the range of 1800 RPM to 24,000 RPM and with loads in the range of ½ to about 50 horsepower. Essentially any corresponding high speed rotating load in this range can be attached directly to the shaft 18. For slower speed rotating loads gear or belt pulley reduction may be required. Turbine nozzle body 16 is firmly attached to bearing housing 76. Together they contain rolling element bearings 21. Said bearings provide for rotable radial and axial support to shaft 18 which at its rear end supports a firmly attached axial flow bladed water turbine wheel 26 incorporating blades 19. The front of the shaft could be attached to any one of a number of rotating loads. Since the turbine wheel in this embodiment is water driven, a convential sliding shaft seal 22 is provided sealing the water filled cavity 40 from air filled cavity 41 located on the opposite of seal 22. Water is supplied to the water turbine at a pressure ranging typically form 40 to 180 PSIG into the annular water turbine inlet cavity 30 through turbine inlet passage 35. The annular water turbine inlet cavity 30 supplies high pressure water to a plurality (twelve in this embodiment) of turbine nozzles configured as round holes with generally varying diameter and positioned appropriately within the nozzle's body 16, so as to produce maximum hydraulic effenciency in combination with the turbine wheel blades 19. Such turbine nozzles are identified as 50 in FIG. 1. As indicated in FIGS. 3 and 4, the turbine nozzles are drilled at an angle of about 10 to 30 degrees with the plane of the face of the nozzle body outlet surface. In my prototype designed for 2 to 6 horsepower at a 160 PSIG inlet pressure and a design speed of 10,000 RPM, the angle was 15 degrees. It is unlikely that the angle need be greater than about 30 degrees or less than 10 degrees. FIG. 3 shows the plane view of the exit portion of the turbine nozzles 50 as viewed in the plane 3—3 in FIG. 4. FIG. 4 shows a section through the nozzle body 16 along the plane 4—4 in FIG. 3 and combines such view with the plane view of turbine blades 19 and turbine wheel 26. The high pressure water is fed from annular water turbine inlet cavity 30 into the plurality of turbine nozzles 50. The water flow accelerates through nozzles 50 converting the pressure energy into kinetic energy with minimum hydraulic losses.

High hydrodynamic efficiency of nozzles 50 is attributed to the particiular combination of round cross sectioned nozzles 50 and the gradual change in the cross section of the flow area along the centerline axis of the individual nozzles 50. The turbine nozzles 50 are positioned close to each other within the nozzle body 16 so as to produce minimum wakes of low velocity fluid in between the passage areas of nozzles 50 and turbine blades 19. Such wakes are considered to be generally harmful to the turbine hydraulic efficiency. Such nozzle positioning as shown in FIGS. 3, 4, 5A, 6A, 5B, and 6B maximizes the percentage of the turbine blades frontal flow area occupied by the high velocity fluid relatively to the frontal flow area occupied by the wakes.

It should be noted here that many hydraulic fluids other than water could be used to power turbine drive units built according to this invention. Persons skilled in the art are aware of the minor changes that should be maintained to retain high effiencies taking into account the differing vicosities of the various hydraulic fluids which could be used.

ELECTRIC GENERATOR

Figure 2:
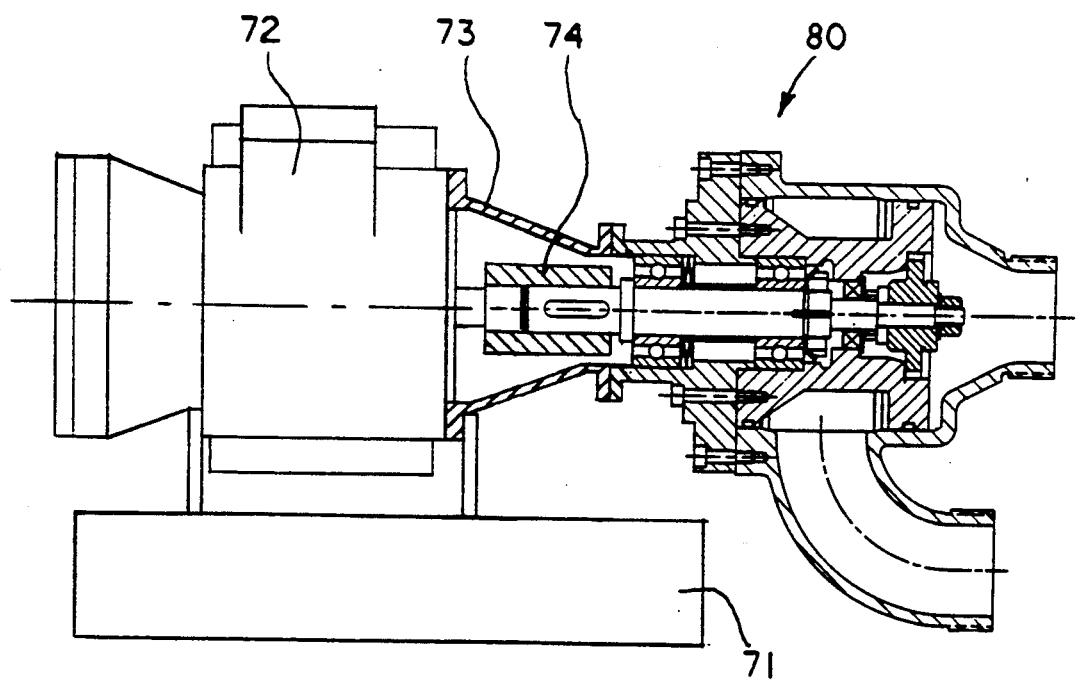
FIG. 2 shows a turbine according to the present invention directly driving an electric generator.

A preferred embodiment of the present invention is to drive a high speed electric generator as shown in FIG. 2. The water turbine 80 is driving high frequecy electric generator 72. In this embodiment the turbine shaft is directly coupled via coupling 74 to generator 72. Excellent power matching between generator and turbine is being achieved. In this embodiment the diameters of turbine nozzle throats shown as 51 in FIG. 4 are increased by 20 percent and inlet pressure is 200 psi and operating speed of 12,000 RPM is specified to match commercially available Bendix electric generator Model 28B285-43 pr oducting up to 8 KVA at 400 Hz frequecy. As shown in FIG. 2, electric generator 72 is mounted on frame 71. Adapter housing 73 is attached concentrically to electric generator 72 and turbine 80. Mounting flange design on turbine 80 is modified in this embodiment to fit the specific configuration of adopter housing 73.

Figure 8:
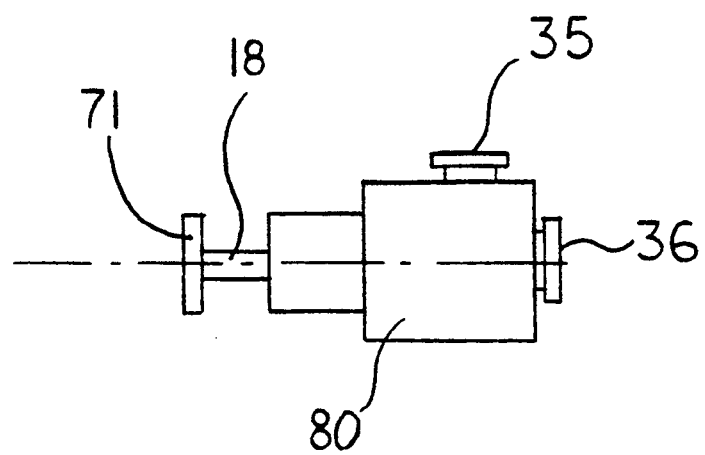
FIG. 8 shows a grinder attached to a water turbine drive.

Another preferred embodiment of the present invention is shown in FIG. 8. In this embodiment a rotating grinding wheel 71 is directly driven by shaft 18 of water turbine 80. Some or all of the discharge water out of the turbine could be utilized to cool the rotating tool and for the prevention of sparks.

Figure 9:
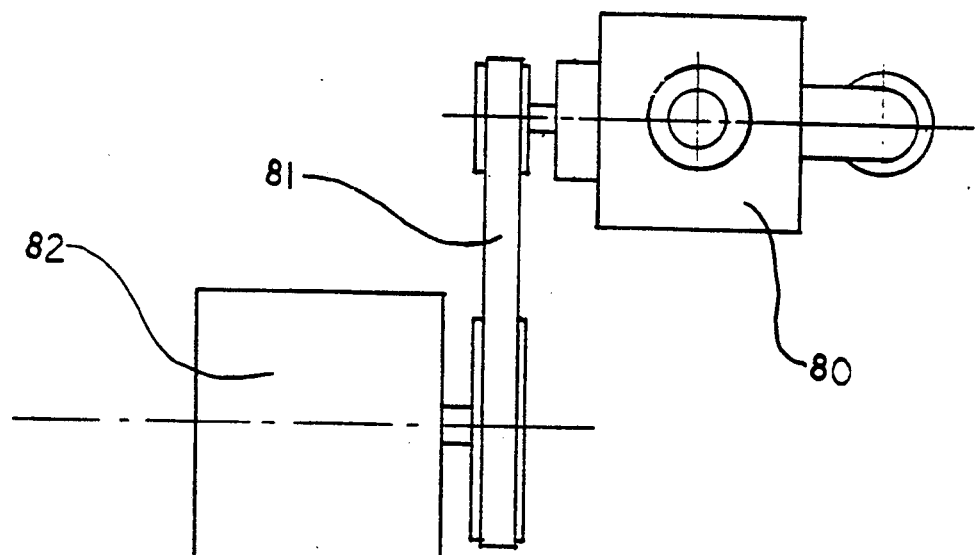
FIG. 9 shows an electric generator being driven via a belt pully.

FIG. 9 shows a 60 Hz electric generator 82 being driven by my high speed water turbine 80 via belt 81 using common speed reducing pulley arrangement with approximately 3:1 pulley diameter ratio for 3600 RPM or 6:1 pulley ratio for 1800 RPM. Frequency of 60 Hz can be maintained by employing suitable feedback control circuitry which adjusts the turbine water flow to match the load using techniques well known in the art.

Figure 10:
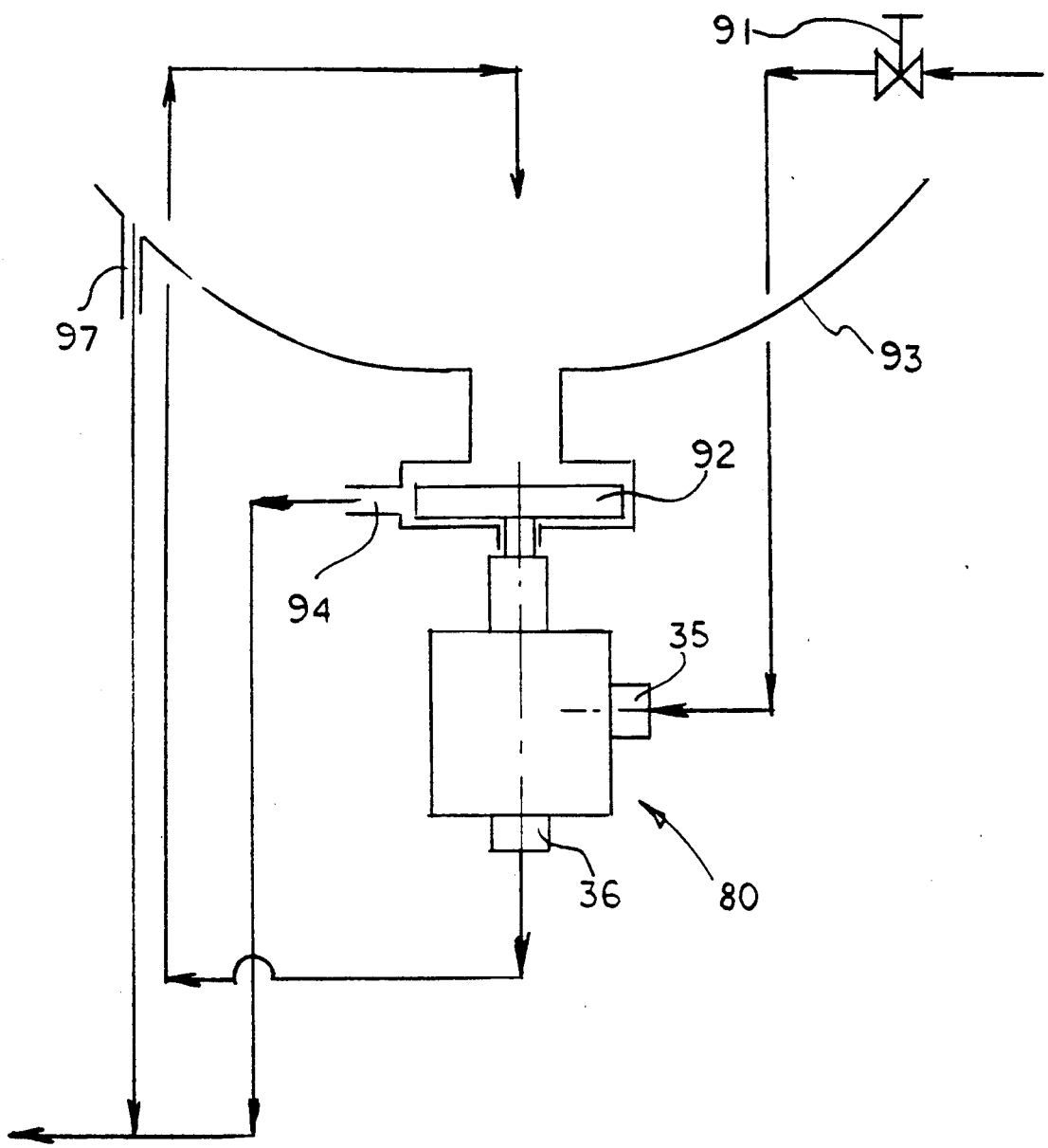
FIG. 10 shows an embodiment of the present invention as a garbage disposal unit.

FIG. 10 shows a common household garbage disposal rotor 92 driven directly by the turbine 80 utilizing pressurized household water supply to drive the water turbine. Discharge water out of the water turbine discharge passage 36 flows further into sink 93 flushing the chopped garbage through passage 94 and down the household drain. Turbine 80 is of the same configuration as shown in FIG. 1 and first described above, except the turbine nozzle passages 50 shown in FIG. 4 have small diameter of 0.10 inch instead of 0.13 inch. Standard household pressure of 50 psi will produce ⅓ horsepower in the speed range of 3000 to 5000 RPM and water flows of about 18 GPM.

Alternate turbine configurations, producing significantly higher shaft horsepower and utilizing the same basic turbine hardware as described above is shown on FIGS. 5B, 6B and 7B. The lower horsepower turbine nozzles configuration shown on FIGS. 5A and 6A incorporates nozzle body 16A and individual nozzles 50A having exit diameter identified as NA on FIG. 5A. The matching lower horsepower tubine wheel and the turbine blades are identified by numerals 26A and 19A respectively on FIG. 7A. The tip diameter of the lower horsepower turbine blades is identified as DA on FIG. 7A. The basic turbine blade configuration diameter identified as DB on FIG. 7A is generally larger than the diameter DA and is machined down to the diameter DA for a lower power version, while it can remain unchanged for a higher power version such as shown on FIG. 7B.

The basic nozzle body utilized for both versions is shown on FIGS. 5A and 6A and it can remain unchanged for the lower power version. For the higher power version the cylindrical portion of the individual nozzle diameter is increased from the dimension NA shown on FIG. 5A to a dimension NB shown on FIG. 5B while utilizing the same centerlines of the individual nozzles. As described above the typical nozzle passage geometry as shown as 50A on FIG. 5A consists of tapered hole at the entrence and leading into a cylindrical portion of the nozzle passages closely adjacent to each other at the nozzle exits. Therefore, an increase of individual nozzle diameters in those regions will cause interference of those passages and resulting in a breakage between the nozzle wall. To correct this undesirable effect, the nozzle body is machined in the axial direction by the amount shown as dimension L on FIG. 5B. The result of the aforemensioned operation will produce closely nested nozzles with larger flow areas as indicated by 50B on FIG. 6B. The turbine blades tip diameter DB on FIG. 7B is sized to match the larger nozzle shown on FIG. 6B. The objective of this design method is to affect minimum changes in the overall turbine configuration, thus the position of the bearings and the shaft remain unchanged for both versions. This dictates that the turbine wheel be machined in the axial direction by the dimension L shown on FIG. 7B, in order to compensate for the aforemensioned change of the nozzle body shown as dimensionL on FIG. 5B. The increase in the nozzle sizes utilizing the aforemensioned procedure to larger nozzles as shown in FIG. 6B changes the outer perimeter of the nozzle exits significantly, thus requiring a change in the matching turbine blades tip diameter from DA shown on FIG. 7A to diameter DB on FIG. 7B. However, the change on the inner permeter of the nozzle exits is minimal because of the compound effect of the nozzles centerlines spreading further apart from each other tending to increase the inner perimeter of the nozzles, while the increase inthe individual nozzle diameters tend to decrease the inner permiter of the nozzles.

For typical high efficiency turbines, the nozzle centerlines are positioned to the shaft centerline with an angle of 60 to 80 degrees (10 to 30 degrees with the turbine nozzle outlet surface) which incombination with an appropriate cone shape of individual nozzles allows for maintaining of relatively constant inner nozzles perimeter utilizing the above described procedure. Therefore, the turbine blades inner diameter shown as DI on FIGS. 7A and 7B which typically is somewhat smaller than the inner perimeter of the nozzles, can remain the same for both versions even if the inner perimeter of the nozzles changes slightly from one version to another. By this method, a relatively simple and inexpensive machining operations allow for utilization of standard premachined turbine nozzle bodies and premachined turbine wheels and blades, thus avoiding a relatively large expense associated with redesigning and retooling of the entire turbine and associated housings.

A higher turbine power output achieved by the above procedure should be matched by the same increase in power absorbed by the load. Standard methods well known in the art are used to provide such matching performance.

It should be understood that the form of the invention illustrated and described herein is intended to be representative only, as certain changes may be made therein without departing from the clear teachings of the disclosure. Acordingly, reference should be made to the following apended claims in determining the full scope of the invention.

I claim:

1. A high speed hydraulic turbine drive comprising:
   (a) a housing;
   (b) a bearing means;
   (c) a shaft bearing support means contained in said housing and for supporting said bearing means;
   (d) a shaft supported by said bearing means and defining a shaft axis;
   (e) a turbine nozzle body defining a turbine body outlet surface and comprising a hydraulic fluid cavity and a plurality of nozzles each of said nozzles providing a passageway for hydraulic fluid to pass from said hydraulic fluid cavity to said outlet surface and defining a nozzle centerline, where each of said nozzle centerlines:
      (1) intersects said turbine body outlet surface at points of intersection on a circle having a diameter less than 12 inches and defining a nozzle exit circle which circle is concentric about said shaft axis and defines a nozzle exit plane which is perpendicular to said axis and
      (2) forms an angle of about 10 to 30 degrees with said nozzle exit plane;
   (f) a hydraulic fluid inlet means for providing hydraulic fluid under pressure to said hydraulic fluid cavity;
   (g) an axial flow hydraulic fluid turbine wheel solidly attached at one end of said shaft having a plurality of turbine blades, said wheel and blades being positioned adjacent to said turbine body outlet surface such that hydraulic fluid discharged from said nozzles impinge on said blades.

2. A turbine drive as set forth in claim 1 wherein said plurality of nozzles is at least 12.

3. A turbine drive as set forth in claim 1 wherein said plurality of nozzles are configured so as to form a set of essentially contiguous but not overlaping elipses where they intersect said turbine body outlet surface on said nozzle exit circle.

4. A turbine drive as set forth in claim 1 wherein said turbine blades are configured such that hydraulic fluid discharged from said blades at normal operating conditions is directed in a direction parallel to said shaft axis.

5. A turbine drive as set forth in claim 1 and further comprising an electric generator connected directly to said shaft.

6. A turbine drive as set forth in claim 1 and further comprising an electric generator connected to said shaft with a speed reduction means.

7. A turbine drive as set forth in claim 1 and further comprising a grinder attached to said shaft.

8. A turbine drive as set forth in claim 1 and further comprising a garbage shredder means attached to said shaft.

9. A method of manufacturing high speed water turbine drives having:
   (a) a housing;
   (b) a bearing means;
   (c) a shaft bearing support means contained in said housing and for supporting said bearing means;
   (d) a shaft supported by said bearing means and defining a shaft axis;
   (e) a turbine nozzle body defining a turbine body outlet surface and positioned inside said housing and sodidly connected to said housing and comprising a hydraulic fluid cavity and a plurality of nozzles each of said nozzles providing a passageway for hydraulic fluid to pass from said hydraulic fluid cavity to said outlet surface and defining a nozzle centerline, where each of said nozzle centerlines:
      (1) intersects said turbine body outlet surface at points of intersection on a circle having a diameter less than 12 inches and defining a nozzle exit circle which circle is concentric about said shaft axis and defines a nozzle exit plane which is perpendicular to said axis and
      (2) forms an angle of about 10 to 30 degrees with said nozzle exit plane;
   (f) a hydraulic fluid inlet means for providing hydraulic fluid under pressure to said hydraulic fluid cavity;
   (g) an axial flow hydraulic fluid turbine wheel solidly attached at the other end of said shaft having a plurality of turbine blades, said wheel and blades being positioned adjacent to said turbine body outlet surface such that hydraulic fluid discharged from said nozzles impinge on said blades;
said method comprising;
   producing a large number of a standard model of said turbine having a standard power output rating and also producing other models of said turbine having substantially increased power output as compared to said standard model without any significant decrease in efficiency by enlarging the diameter of said plurality of nozzles of said standard model by cutting said turbine nozzle body of said standard model so that said turbine body outlet surface is closer to said hydraulic fluid cavity, moving said turbine wheel on said shaft to maintain essentially the same relatively distance between said turbine wheel and said turbine body outlet surface and increasing the size of said turbine blades.

10. The method as set forth in claim 6 wherein the power output of said standard model is about four horsepower.

11. The method of claim 7 wherein the output of at least one of said other models is increased by at least 30 percent over said standard model.

* * * * *